(12) United States Patent
Beck et al.

(10) Patent No.: US 9,336,294 B2
(45) Date of Patent: May 10, 2016

(54) AUTONOMICALLY DEFINING HOT STORAGE AND HEAVY WORKLOADS

(71) Applicant: International Business Machines Corporation, Armonk, NY (US)

(72) Inventors: Kevin L. Beck, Portland, OR (US); Kevin J. Cherkauer, Portland, OR (US)

(73) Assignee: International Business Machines Corporation, Armonk, NY (US)

(*) Notice: Subject to any disclaimer, the term of this patent is extended or adjusted under 35 U.S.C. 154(b) by 175 days.

(21) Appl. No.: 14/018,052

(22) Filed: Sep. 4, 2013

(65) Prior Publication Data
US 2015/0066960 A1 Mar. 5, 2015

(51) Int. Cl.
G06F 12/00 (2006.01)
G06F 17/30 (2006.01)

(52) U.S. Cl.
CPC .... G06F 17/30589 (2013.01); G06F 17/30312 (2013.01)

(58) Field of Classification Search
CPC .............. G06F 17/30; G06F 17/30312; G06F 17/30589; G06F 17/30595; G06Q 30/0282; G06Q 30/0201; G06Q 10/063; H04N 13/0051
See application file for complete search history.

(56) References Cited

U.S. PATENT DOCUMENTS

| | | | |
|---|---|---|---|
| 5,758,338 A | 5/1998 | Faloutsos et al. | |
| 5,950,185 A | 9/1999 | Alon et al. | |
| 5,954,820 A | 9/1999 | Hetzler | |
| 7,493,316 B2 | 2/2009 | Chaudhuri et al. | |
| 8,126,742 B2 | 2/2012 | Bond, Jr. et al. | |
| 8,255,915 B1 | 8/2012 | Blanding et al. | |
| 8,380,942 B1* | 2/2013 | Corddry | G06F 12/0246 711/154 |
| 2001/0013087 A1* | 8/2001 | Ronstrom | 711/133 |
| 2002/0002556 A1* | 1/2002 | Yoshida et al. | 707/102 |
| 2002/0103965 A1* | 8/2002 | Dawkins | G06F 12/122 711/113 |
| 2003/0140207 A1 | 7/2003 | Nagase et al. | |
| 2004/0267746 A1* | 12/2004 | Marcjan et al. | 707/8 |
| 2005/0203881 A1* | 9/2005 | Sakamoto et al. | 707/3 |
| 2005/0223028 A1* | 10/2005 | Geiner et al. | 707/103 R |
| 2006/0015529 A1* | 1/2006 | Yagawa | G06F 17/30067 |
| 2008/0040301 A1* | 2/2008 | Sadagopan et al. | 706/16 |
| 2009/0300283 A1 | 12/2009 | Kudo | |
| 2011/0072206 A1* | 3/2011 | Ross | G06F 17/302 711/108 |
| 2011/0225115 A1* | 9/2011 | Moitra et al. | 706/50 |
| 2011/0246639 A1* | 10/2011 | Feder et al. | 709/224 |
| 2011/0270968 A1 | 11/2011 | Salsburg et al. | |
| 2012/0254197 A1* | 10/2012 | Kuzmin | 707/751 |

(Continued)

FOREIGN PATENT DOCUMENTS

WO WO 2012080707 A1 * 6/2012 ........ G06F 17/30705

*Primary Examiner* — Augustine K Obisesan
(74) *Attorney, Agent, or Firm* — North Shore Patents, P.C.; Michele Liu Baillie

(57) ABSTRACT

In defining database objects for storage in a storage hierarchy, frequencies of accesses of a plurality of database objects over a predetermined time period are observed. A mean and standard deviation for the plurality of database objects are computed based on the observed frequencies of accesses of the plurality of database objects. A z-score for a given database object is determined based on a comparison of the frequency of access for the given database with the mean and standard deviation computed for the plurality of database objects by the computing processor; and a level in the storage hierarchy corresponding to the z-score of the given database object is determined. The given database object may then be stored at the level in the storage hierarchy corresponding to the z-score of the given database object.

10 Claims, 3 Drawing Sheets

(56) References Cited

U.S. PATENT DOCUMENTS

2012/0278569 A1* 11/2012 Kawakami ............ G06F 3/0608 711/162
2012/0317249 A1 12/2012 Salsburg et al.
2013/0174176 A1 7/2013 Kopylovitz
2013/0262749 A1 10/2013 Olkawa et al.

* cited by examiner

AUTONOMICALLY DEFINING HOT STORAGE AND HEAVY WORKLOADS

CROSS-REFERENCE TO RELATED APPLICATIONS

The present application relates to co-pending U.S. patent application Ser. No. 14/018,115, filed on (Elate) Sep. 4, 2013.

BACKGROUND

Different types of data storage incur different costs, with faster storage costing more per gigabyte than slower storage. One approach to managing storage costs is to use hierarchical or "multi-temperature storage," where frequently accessed (aka "hot") data are stored on faster but more expensive storage (e.g. solid-state "disks"), and less frequently accessed data are moved to progressively slower but cheaper storage (e.g. physical hard disks, tape drives, etc.).

Specific database applications or users also exhibit different workload patterns. Some make high-frequency access to data while others may make less frequent data accesses. In another approach, workload management techniques perform a similar task to multi-temperature storage in that they provide a mechanism to give different workloads differential levels of access to resources. For example, giving a high-priority workload a larger share of available CPU time than other workloads is similar qualitatively to giving a given subset of data residence on a faster backing storage device.

However, the above approaches require user intervention to determine which data or workloads should get proportionally more access to the fast and expensive resources, and which should be relegated more to the slower and cheaper resources.

SUMMARY

According to one embodiment of the present invention, in defining database objects for storage in a storage hierarchy, frequencies of accesses of a plurality of database objects over a predetermined time period are observed. A mean and standard deviation for the plurality of database objects are computed based on the observed frequencies of accesses of the plurality of database objects. A z-score for a given database object is determined based on a comparison of a frequency of access for the given database object with the mean and standard deviation of the plurality of database objects by the computing processor; and a level in the storage hierarchy corresponding to the z-score of the given database object is determined. The given database object may then be stored at the level in the storage hierarchy corresponding to the z-score of the given database object.

DETAILED DESCRIPTION

Figure 1:
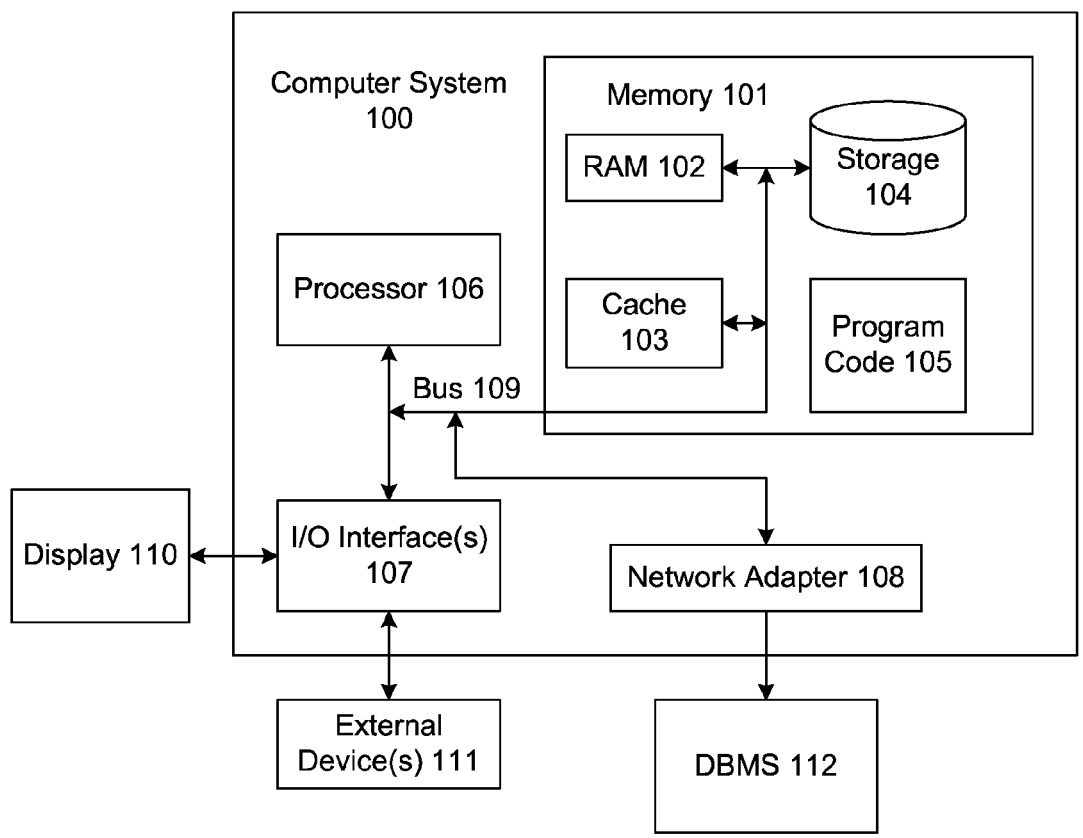
FIG. 1 illustrates an embodiment of a system for defining database objects for storage in a storage hierarchy according to the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of computer readable storage media would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Oracle Corporation, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an embodiment of a system for defining database objects for storage in a storage hierarchy according to the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more database management systems (DBMS) 112 via network adapter 108.

Figure 2:
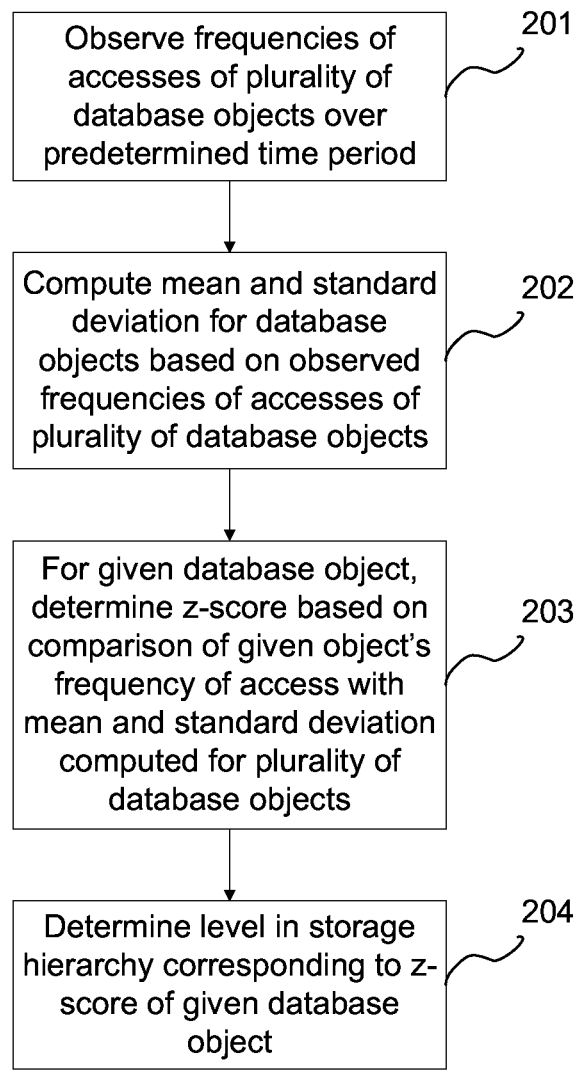
FIG. 2 illustrates an embodiment of a method for defining database objects for storage in a storage hierarchy according to the present invention.

FIG. 2 illustrates an embodiment of a method for defining database objects for storage in a storage hierarchy according to the present invention. The database objects may include tables, indexes, etc. of a database. The method observes the frequencies of accesses of a plurality of database objects over a predetermined time period (201). The method computes the mean and standard deviation for the plurality of database objects based on the observed frequencies of accesses of the database objects (202). For a given database object, the method determines the z-score based on a comparison of the given object's frequency of access with the mean and standard deviation computed for the plurality of database objects (203). In this embodiment, the z-score indicates the difference, in units of the standard deviation, between the frequency of access of the given database object and the mean and standard deviation for all database objects being observed. The method then determines the level in the storage hierarchy corresponding to the z-score of the given database object (204).

Figure 3:
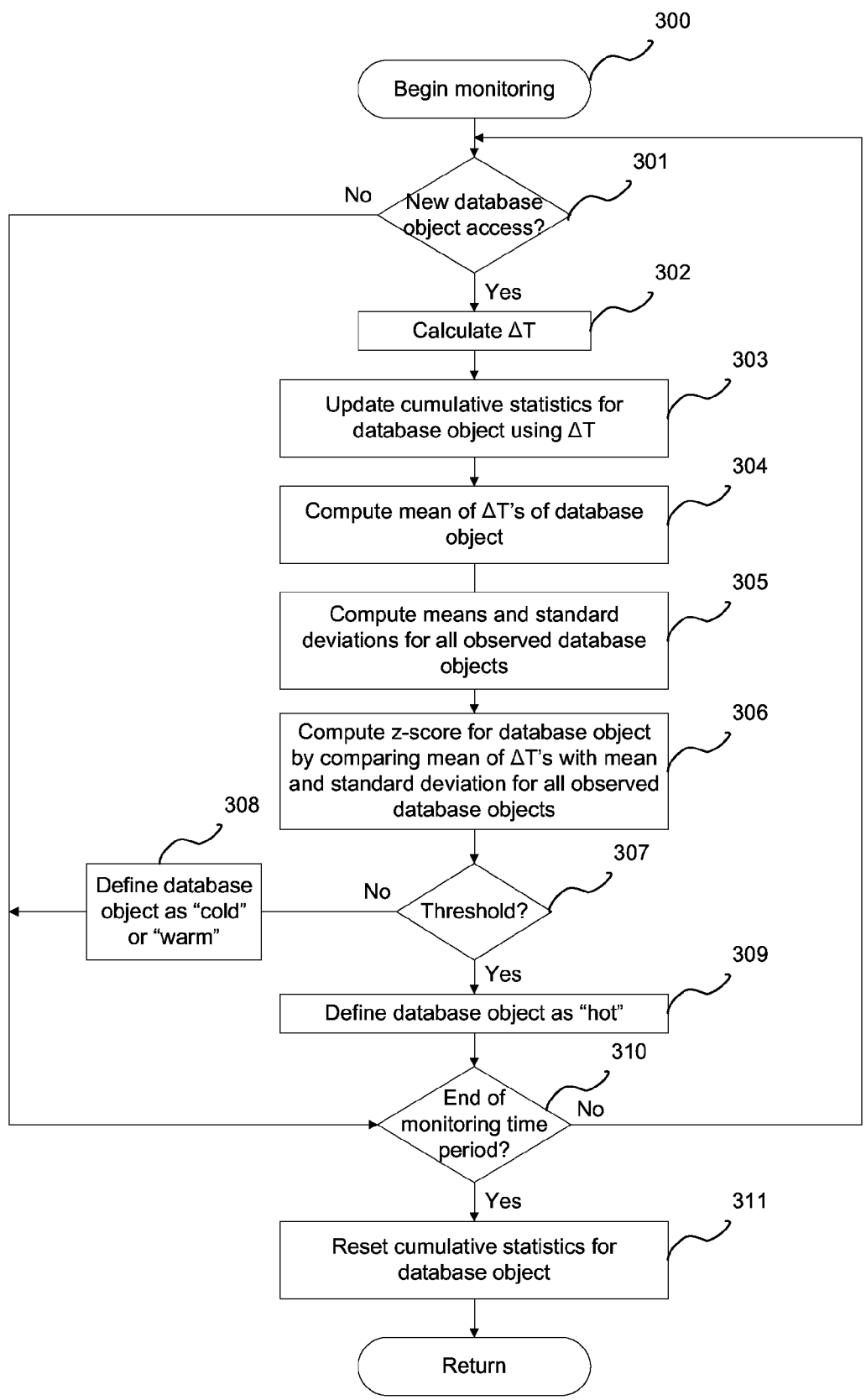
FIG. 3 illustrates in more detail the embodiment of a method for defining database objects for storage in a storage hierarchy according to the present invention.

FIG. 3 illustrates in more detail the embodiment of a method for defining database objects for storage in a storage hierarchy according to the present invention. In this embodiment, the frequencies of access for database objects are observed over a time period. Monitoring for database object accesses begins at the beginning of this time period (300). A record of monitoring data may be maintained for each database object observed, including the timestamp of the most recent access and cumulative statistics for each database object, as described further below. When a new database object access is detected (301), the method calculates the delta time ($\Delta T$) (302) as the current time minus the timestamp of the most recent access of the database object. The cumulative statistics for the database object are updated using $\Delta T$ (303). In this embodiment, the cumulative statistics includes: a count N of observations for the database object; the sum of ΔT's (ΣΔT) for the database object; and the sum of the squares of ΔT's (Σ(ΔT)²) for the database object. These three cumulative statistics enable the computing of the mean and the standard deviation for the database object (304), without having to save the timestamp of every access. In this embodiment, the mean of the ΔT's of the database object is computed (304). The mean and standard deviation of all observed database objects is also computed (305). The z-score for the database object is computed by comparing the mean of the ΔT's for the database object with the mean and standard deviation for all observed database objects (306). In this embodiment, the timestamp of the most recent access is the minimum data required to compute the ΔT's. The cumulative statistics (count, ΣΔT, and Σ(ΔT)²) are the minimum data required to generate the overall mean and standard deviation for all observed database objects. The minimum data required to generate the mean of a single database object is the count and ΣΔT for that object.

Once the z-scores of the database object is computed, the "temperature" of the database object may be defined according to a preconfigured z-score threshold. The z-score threshold may be a user settable parameter. Alternatively, the z-score threshold can be automatically adjusted based on how much fast storage is available. For example, if availability of fast storage is low, the z-score threshold may be raised. If availability of fast storage is high, the z-score threshold may be lowered. If the computed z-score meets or exceeds the threshold (307), the database object is defined as "hot" (309). Otherwise, the database object is defined as "cold" or "warm" (308). For example, the threshold may be configured such that a z-scores corresponding to a cumulative probability of 0.99 or above (i.e., database objects in the 1% tail of a single-tailed normal distribution) as "hot," z-scores corresponding to cumulative probabilities of 0.95-0.99 (i.e., database objects in the 5% tail, excluding the 1% tail) as "warm," and all other z-scores as "cold." The database objects may then be stored or moved to a level of the storage hierarchy corresponding to their z-scores. For example, the database objects defined as "hot" may be stored or moved to fast storage, database object's defined as "warm" may be stored or moved to slower and/or less expensive storage, and database objects defined as "cold" may be stored or moved to the slowest and/or least expensive storage. Any number of levels in the storage hierarchy can be defined and any distribution of z-scores can be chosen. Similarly for workload management, the busiest workloads can be identified by z-scores with a preconfigured threshold, and then access increased or decreased based on the priorities of those workloads plus their z-scores. For example, a high-priority workload with a z-score corresponding to a cumulative probability of 0.99 or higher could be granted many resources, while a low-priority workload that also has a z-score corresponding to a cumulative probability of 0.99 or higher could be granted fewer resources than the high-priority workload. In this manner, the expected normal distribution of accesses in the real world may be taken into account.

In one embodiment, the statistics are accumulated at different granularities spanning different ranges of recent time. For each such separate granularity, a minimum of three additional cumulative sums are maintained and updated. For convenience, these can be expressed as $\Sigma x^0$ (observation raised to the 0th power, which when summed is the count), $\Sigma x^1$ (sum of the observations), and $\Sigma x^2$ (sum of the squares of the observations). For example, these sums may be accumulated for the most recent 1 hour, most recent 1 day, most recent 30 days, and most recent 1 year. In this example, twelve cumulative statistics, plus the timestamp of the most recent access, enables the mean and standard deviation of a given database object to be computed at four different granularities.

Referring again to FIG. 3, at the end of the monitoring time period (310), the cumulative statistics for the database object are reset (311). For example, assume that the time period is 1 hour. When the current hour is finished and the next hour is to be started, the hourly cumulative statistics are reset to zero. However, at this point useful statistics for the most recent hour are no longer available for some time after the new hour has started, due to a lack of observations. This means that the most recent access data is not available. To address this situation, each granularity of statistics may be kept in at least two overlapping windows. For example, two windows may be used for hourly statistics which are offset by a half-hour, such as one window covering 8:00-9:00 and the next window covering 8:30-9:30. When 9:00 is reached, the cumulative statistics for the 8:00-9:00 window are reset and monitoring for the new 9:00-10:00 window begins. Meanwhile the gathering of the cumulative statistics for the 8:30-9:30 window is still active for another ½ hour and already contains observations for the most recent 30 minutes. The statistics accumulated in this window may be used, with appropriate normalization, as the most recent access data for observations in the 9:00-10:00 window. In this way, statistics for the most recent access are made available. Any number of overlapping windows may be used. For example, 8:00-9:00, 8:20-9:20, and 8:40-9:40 give three overlapping windows, and when the statistics collected in one window are reset, there is still ⅔ of an hour of observations available in one of the other overlapping windows. More generally, for n overlapping windows used, there are always observations covering at least (n−1)/n of the time interval in question available once monitoring has been enabled for at least that long.

Optionally, to define when it is time to reset a window, modulo arithmetic can be used against the "epochal" computer time of number of seconds, S, since Jan. 1, 1970. The actual wall-clock time or current time zone does not matter. For example, in defining two hour-long windows that overlap by ½ hour, one could be defined as resetting whenever (S mod 3600)=0 and the other whenever (S mod 3600)=1800. 3600 is just the number of seconds in an hour and 1800 is half of this number. The same technique can be used for any granularity. For example, a 30-day grain size would use (S mod (30×24× 60×60)) where 30×24×60×60 is just the number of seconds in 30 days (30 days times 24 hours in a day times 60 minutes in an hour times 60 seconds in a minute).

In another embodiment, the statistics collected can be used in trend detection. For example, if the statistics for most recent 1 year, 30 days, 1 day, and 1 hour are kept, the means of these four granularities show how the frequency has been changing over time. Making the assumption that the mean of each time period best represents the middle of that time period, the statistics correspond to estimates for the mean at times of ½ year ago, 15 days ago, 12 hours ago, and ½ hour ago. If overlapping observation windows are also kept as described above, then even more data points are available. Standard curve-fitting techniques, including line fitting, can then be applied to detect trends. The trend detection can be interpolated into the future to predict storage use growth, track the size of database objects and/or frequencies of accesses, or predict when a customer will run out of available storage. The level in the storage hierarchy for a database object may be modified based on the determined z-score for the database object and any detected trends. Note that trend detection may be done using the cumulative statistics without calculating the z-score.

In another embodiment, the user can automatically be given advice based on the definitions of storage temperature or workload busyness, described above, and based on the detected trends. For example, if data migration to different storage is not actually automated, the user can still be notified when data should be moved to a different level of the storage hierarchy, or when a workload is a candidate to be granted more resources or fewer resources. Also, the user may be automatically given advice based on the detected trends, such as be given the warning, "It appears the 'customer' table will run out of available storage in 3 days."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for defining database objects for storage in a storage hierarchy, the computer program product comprising:
a non-transitory computer readable storage medium having computer readable program code embodied therewith, the program code executable by a processor to:
automatically manage storage costs in the storage hierarchy for a plurality of database objects by:
observing frequencies of accesses of a plurality of database objects over a predetermined time period comprising:
determining that a new access of the given database object occurs;
in response to determining that the new access of the given database object occurs, calculating a delta time as a current time minus a timestamp of a most recent access of the given database object; and
updating cumulative statistics for the given database object using the delta time;
computing a mean and a standard deviation for the plurality of database objects based on the observed frequencies of accesses of the plurality of database objects;
determining a z-score for a given database object for correlation to an access frequency level for the given database object and storing the given database object in the storage hierarchy, the z-score based on a comparison of the frequency of access for the given database object with the mean and standard deviation of the plurality of database objects comprising:
computing a mean of the delta times for the given database object and the mean and standard deviation for the plurality of database objects using the cumulative statistics for the given database object and the plurality of database objects; and
computing the z-score for the given database object using the mean of the delta times for the given database object and the mean and the standard deviation for the plurality of database objects;
defining the access frequency level for the given database object based on the z-score of the given database object; and
storing the given database object in the storage hierarchy according to the access frequency level and the storage costs associated with the storage hierarchy, wherein a more frequently accessed database object is stored within the storage hierarchy in higher cost storage, where the frequently accessed database object is accessed quicker than a less frequently accessed database object.

2. The computer program product of claim 1, wherein the program code is further executable by the processor to:
store the given database object at a level in the storage hierarchy corresponding to the z-score of the given database object.

3. The computer program product of claim 1, wherein the cumulative statistics for the given database object comprises: a count of observations for the given database object; a sum of delta times for the given database object; and a sum of squares of the delta times for the given database object.

4. The computer program product of claim 1, wherein the program code executable by the processor to determine the level in the storage hierarchy corresponding to the z-score of the given database object is further executable by the processor to:
determine whether the z-score for the given database object meets a preconfigured threshold; and
define the level in the storage hierarchy corresponding to the z-score of the given database object based on whether the z-score of the given database object meets the preconfigured threshold.

5. The computer program product of claim 1, wherein the program code executable by the processor is further executable by the processor to:
observe the frequencies of the accesses of the plurality of database objects over a plurality of time periods;
detect any trends based on the observed frequencies over the plurality of time periods; and
determine whether to modify the level in the storage hierarchy for the given database object based on the determined z-score for the given database object and any detected trends.

6. The computer program product of claim 1, wherein the program code executable by the processor to observe the frequencies of the accesses of the plurality of database objects over the predetermined time period is further executable by the processor to:
observe the frequencies of the accesses of the plurality of database objects over a plurality of time periods, wherein the plurality of time periods comprises at least two overlapping time periods.

7. A system comprising:
a processor; and
a computer readable storage medium having computer readable program code embodied therewith, the program code executable by the processor to: automatically manage storage costs in the storage hierarchy for a plurality of database objects by:
observing frequencies of accesses of a plurality of database objects over a predetermined time period comprising:
determining that a new access of the given database object occurs;
in response to determining that the new access of the given database object occurs, calculating a delta time as a current time minus a timestamp of a most recent access of the given database object; and
updating cumulative statistics for the given database object using the delta time;
computing a mean and a standard deviation for the plurality of database objects based on the observed frequencies of accesses of the plurality of database objects;
determining a z-score for a given database object for correlation to an access frequency level for the given database object and storing the given database object in the storage hierarchy, the z-score based on a comparison of the frequency of access for the given database object with the mean and standard deviation of the plurality of database objects comprising:

computing a mean of the delta times for the given database object and the mean and standard deviation for the plurality of database objects using the cumulative statistics for the given database object and the plurality of database objects; and computing the z-score for the given database object using the mean of the delta times for the given database object and the mean and the standard deviation for the plurality of database objects;

defining the access frequency level for the given database object based on the z-score of the given database object; and storing the given database object in the storage hierarchy according to the access frequency level and the storage costs associated with the storage hierarchy, wherein a more frequently accessed database object is stored within the storage hierarchy in higher cost storage, where the frequently accessed database object is accessed quicker than a less frequently accessed database object.

8. The system of claim 7, wherein the program code is further executable by the processor to:

store the given database object at a level in the storage hierarchy corresponding to the z-score of the given database object.

9. The system of claim 7, wherein the program code executable by the processor is further executable by the processor to:

observe the frequencies of the accesses of the plurality of database objects over a plurality of time periods;

detect any trends based on the observed frequencies over the plurality of time periods; and determine whether to modify the level in the storage hierarchy for the given database object based on the determined z-score for the given database object and any detected trends.

10. The system of claim 7, wherein the program code executable by the processor to observe the frequencies of the accesses of the plurality of database objects over the predetermined time period is further executable by the processor to:

observe the frequencies of the accesses of the plurality of database objects over a plurality of time periods, wherein the plurality of time periods comprises at least two overlapping time periods.

\* \* \* \* \*